Jan. 11, 1944. J. M. BARRON 2,338,794
CONVERSION OF HYDROCARBON OILS
Filed Dec. 31, 1940 2 Sheets-Sheet 1

JOSEPH MASON BARRON
INVENTOR
BY
HIS ATTORNEYS

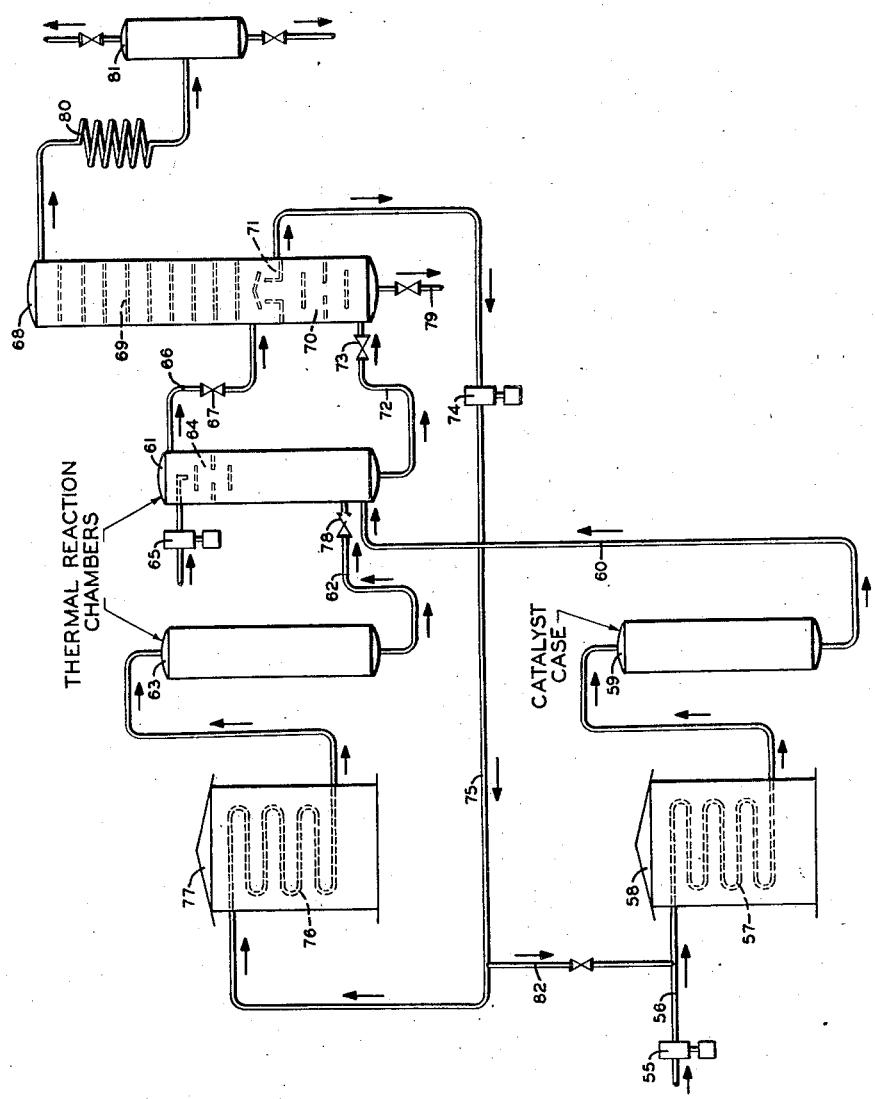

Patented Jan. 11, 1944

2,338,794

UNITED STATES PATENT OFFICE 2,338,794

CONVERSION OF HYDROCARBON OILS

Joseph Mason Barron, Port Arthur, Tex., assignor, by mesne assignments, to The Texas Company, New York, N. Y., a corporation of Delaware Application December 31, 1940, Serial No. 372,452

7 Claims. (Cl. 196—49)

This invention relates to certain improvements in thermal and catalytic cracking and involves particularly certain improvements in combination thermal and catalytic cracking.

The invention contemplates a unitary thermal and catalytic cracking process in which raw charging stock is subjected to catalytic cracking while cycle condensate is subjected to thermal cracking and in which the cracked products of both the thermal and catalytic cracking operations are separated into vapors and residue, the separated vapors dephlegmated to effect the separation of heavier constituents therefrom and the dephlegmated vapors subjected to further fractionation to separate lighter products from higher boiling reflux condensate which constitutes the cycle condensate which is directed to the thermal cracking zone. In accordance with the invention a heavy stock such as heavy gas oil or topped or reduced crude is employed in dephlegmating vapors from the thermal and catalytic cracking operations under such conditions that the lighter constituents of such charging stock are distilled over into the subsequent fractionator in which the cycle condensate is obtained.

The invention contemplates a combination process in which a suitable stock for catalytic cracking is subjected to catalytic cracking, as in a single pass operation, while cycle condensate is passed through a heating zone and subjected to thermal cracking and in which vapors from both the catalytic and thermal cracking operations are dephlegmated with a heavy charging stock such as topped or reduced crude, the resultant mixture of reflux condensate and unvaporized charging stock being combined with the heated products from the cycle condensate heating zone for cracking in a subsequent reaction zone and in which the resultant products of the thermal cracking are separated into vapors and residue and the vapors combined with the products from the catalytic cracking zone for fractionation therewith. The invention, furthermore, contemplates a process in which the products of the thermal cracking are separated into vapors and residue, the vapors combined with the products from the catalytic cracking operation and the residue subjected to further distillation or flashing to evolve vapors which are combined with products from the catalytic cracking operation for fractionation.

The invention also contemplates carrying on a separation of the thermally cracked products under conditions in which liquid is prevented from accumulating in the separating chamber and a portion of the vapors is withdrawn with the liquid residue and the mixture of vapors and residue thus withdrawn subjected to further distillation or flashing to effect an additional separation of vapors from residue. In this operation the vapors evolved in such subsequent flashing or distilling operation are dephlegmated and the dephlegmated vapors are combined with separated vapors from the separating chamber for fractionation to separate lighter products from a cycle condensate which is passed to the heating zone. In one method of conducting the process the dephlegmated vapors from the subsequent vaporization zone and the separated vapors from the primary separating zone are dephlegmated with charging stock to form a mixture of reflux condensate and unvaporized charging stock which is combined with the heated products from the heating zone for cracking in a reaction zone, while uncondensed vapors are passed to a subsequent reaction zone wherein lighter products are separated from higher boiling reflux condensate which is cycled to the heating zone.

The invention, furthermore, contemplates a complete unitary process for processing crude petroleum to separate a stock adapted for catalytic cracking and a stock adapted for thermal cracking with the simultaneous cracking of both stocks.

For the purpose of more fully disclosing the invention reference is now had to the accompanying drawings wherein:

Fig. 2 is a flow diagram showing a modification of the invention.

Figure 1:
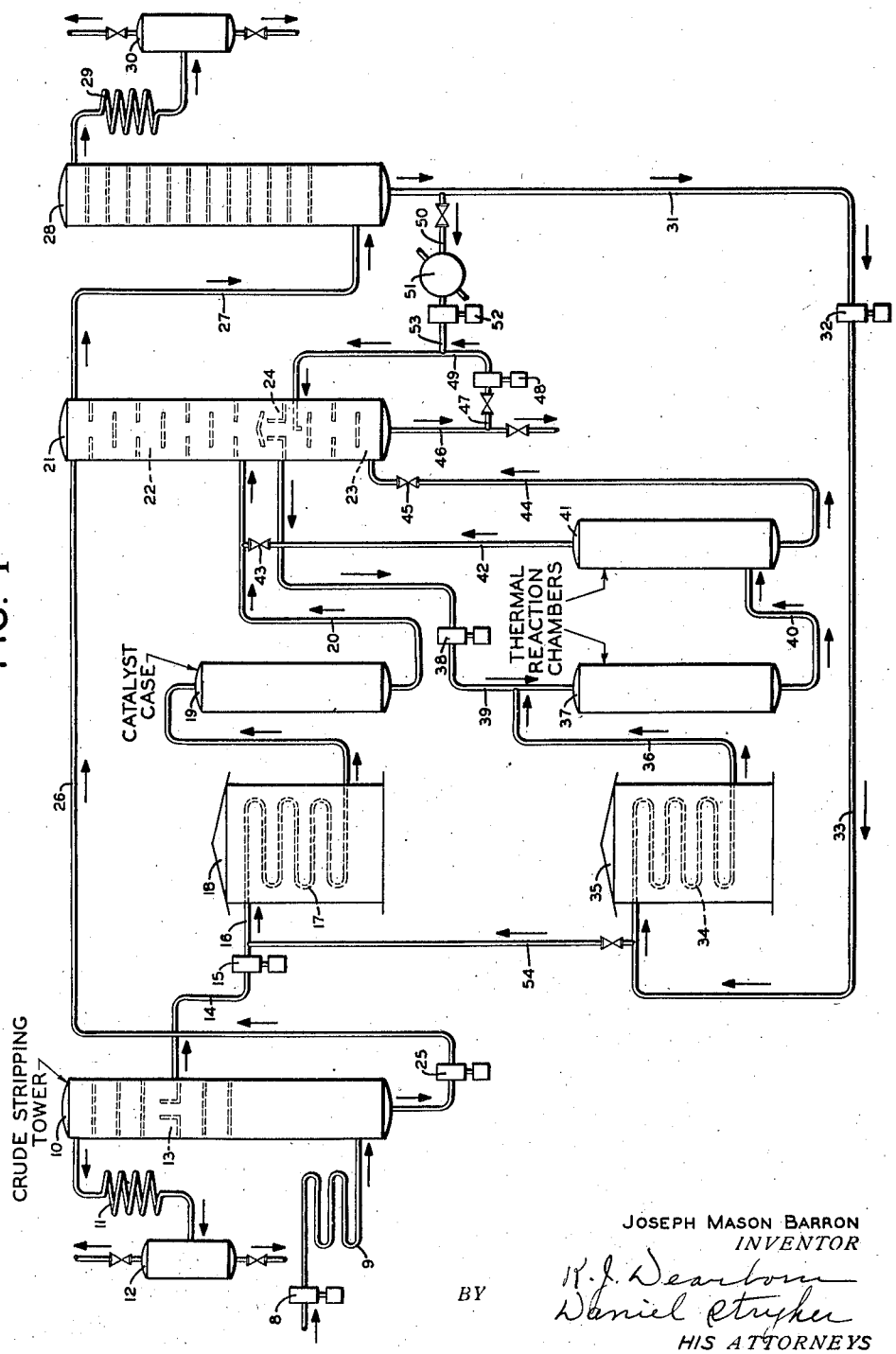
Fig. 1 is a flow diagram of an apparatus adapted for practicing the invention.

Referring to the apparatus illustrated in Fig. 1 a suitable charging stock, such as crude petroleum containing relatively lighter constituents adapted for catalytic cracking and heavier constituents more adapted for thermal cracking, is directed by a pump 8 through a coil 9 which may be heated by heat exchange with hot cracked products of the system or otherwise suitably heated to raise the oil to a desired distilling temperature. The heated oil is separated into vapors and residue in a crude stripping tower 10 and the separated vapors fractionated to form a condensate collected on a tray 13 adapted for catalytic cracking while light components such as gasoline may be condensed in a condenser coil 11 and collected in a receiving drum 12.

The fraction intended for catalytic cracking is withdrawn from the tray 13 through a line 14 and conducted by a pump 15 through a charging line 16 to a heating coil 17 disposed in a furnace 18 adapted for heating the oil to the temperature desired for catalytic cracking. The oil thus heated is delivered to a catalyst chamber 19 which contains a bed of suitable catalytic material.

The catalyst consists advantageously of a synthetic silica-alumina type of catalyst. Various acid-treated and metal-substituted clays such as the Super-Filtrols and acid-treated and metal-substituted natural or artificial zeolites, such as the artificial zeolite known as Doucil may be employed. Various metals such as uranium, molybdenum, manganese, lead, zinc, zirconium, nickel and the like, may be substituted in the clays or zeolites. Likewise, the combination of certain acid-treated active clays of the character of Filtrol, together with added proportions of alumina or silica or both may be employed. Alumina alone may be used under certain conditions. The synthetic alumina catalysts can be improved by the addition of other constituents such as zirconium oxide or molybdenum oxide.

The products of the catalytic cracking pass through a transfer line 20 to a dephlegmator or fractionator 21. As illustrated, the tower 21 is formed of an upper section 22 and a lower section 23 separated by a trap-out tray 24 and the line 20 communicates with the section 22 or with that portion of the tower above the tray 24. Crude residuum is withdrawn from the crude stripping tower 10 by pump 25 and directed through a line 26 to the fractionating section 22 to dephlegmate the vapors therein, a resultant mixture of reflux condensate and unvaporized crude residuum collecting on the tray 24. Vapors uncondensed in the tower 21 pass through a vapor line 27 to a fractionating tower 28 which is supplied with cooling or refluxing means not shown and adapted to fractionate the vapors so as to take off an overhead vapor fraction of desired end point which is passed through a condenser 29 and collected as a distillate in a receiving drum or gas separator 30.

Reflux condensate from the tower 28 is withdrawn through a line 31 and directed by a pump 32 through a line 33 to a heating coil 34 suitably disposed in a furnace 35 adapted for heating the cycle condensate to a desired cracking temperature. The heated products pass from the heating coil 34 through a transfer line 36 to a reaction chamber 37 which is suitably heat insulated so as to maintain a cracking temperature therein. The mixture of reflux condensate and unvaporized charging stock which is collected on tray 24 of tower 21 is conducted by a pump 38 through line 39 to the transfer line 36 or reaction chamber 37 so that the mixture may be subjected to cracking heat supplied by the hot stream flowing through the transfer line 36 from the heating coil 34. The resultant products of cracking pass through a transfer line 40 to a subsequent reaction chamber 41 which is also suitably heat insulated to maintain cracking temperatures therein and wherein separation of vapors from liquid residue takes place. Separated vapors from the chamber 41 pass through a line 42 to the fractionating section 22. The line 42 may conveniently communicate with the transfer line 20 through which the cracked products from the catalytic cracking chamber 19 are transferred to the fractionating section 22. Since it is generally desirable to carry on the thermal cracking at higher pressure than that of the catalytic cracking the line 42 may be provided with a pressure reducing valve 43. Residue from reaction chamber 41 is passed through a line 44 and pressure reducing valve 45 to section 23 of tower 21. In conducting the cracking in chambers 37 and 41 liquid is prevented from accumulating in either of the chambers, the combined vaporous and liquid constituents being rapidly withdrawn from chamber 37 through line 40 to the chamber 41 and from chamber 41 a portion of the vapors is withdrawn with the residue through line 44 and the mixture of vapors and liquid flashed or subjected to further distillation in dephlegmating section 23. The resultant residue is withdrawn from chamber 23 through a line 46. The line 46 may be provided with a branch line 47 leading to a pump 48 by which a portion of the residue is continuously cycled through a line 49 back to the chamber 23 to flow over baffles or contact elements therein and dephlegmate the vapors. This circulation of residue through the chamber 23 serves to maintain a liquid flow therein which prevents coking. By suitably insulating the pump and lines the circulation may be conducted without any substantial cooling. For supplying such cooling as may be needed to the dephlegmating section 23 a portion of the reflux condensate may be withdrawn from the line 31 through a branch line 50 and cooler 51 and conducted by a pump 52 and line 53 to the dephlegmating section 23 or to the line 49 leading thereto. Vapors uncondensed in dephlegmator 23 pass upwardly to the dephlegmating section 22 wherein they are subjected to fractionation together with products from the catalytic cracking operation and with the separately withdrawn vapors from reaction chamber 41.

The catalytic cracking of the straight run condensate which is directed through heating coil 17 and reaction chamber 19 may be conducted as a once-through or single-pass operation while a cycle condensate including cracked constituents and also components from the crude residuum which have been vaporized in chamber 22 and collected as condensate in chamber 28, constitutes the material charged to the thermal cracking portion of the process. In a modification of the invention however a portion of the condensate being directed to the thermal cracking zone may be diverted from line 33 through a branch line 54 to the transfer line 16 or heating coil 17.

In the modification of the invention shown in Fig. 2 a stock suitable for catalytic cracking, such as that collected on the tray 13 of the tower 10 of Fig. 1, is conducted by a pump 55 through a charging line 56 to a heating coil 57 disposed in a furnace 58 adapted for heating the oil to a temperature desired for catalytic cracking. The resultant heated oil is passed to a catalyst chamber 59 containing a suitable catalytic material such as any of the catalysts mentioned for the reaction chamber 19 of Fig. 1. The products of the catalytic cracking operation pass through a transfer line 60 to a separating chamber 61 which also receives cracked products through a transfer line 62 from a thermal cracking chamber 63. The upper portion of the chamber 61 is advantageously provided with a dephlegmating section 64 and topped or reduced crude or heavy gas oil and the like may be charged by pump 65 to such dephlegmating section to dephlegmate the vapors therein. Vapors uncondensed in the dephlegmating section 64 pass through a line 66, preferably having a pressure reducing valve 67, to a fractionating tower 68. The tower 68 is formed with an upper section 69 and a lower section 70 separated by a trap-out tray 71. The vapor line 66 communicates with the upper fractionating section 69. Residue from chamber 61 is passed through a line 72, preferably having a pressure reducing valve 73, to the section 70 of tower 68 wherein further vaporization of the residue takes place and wherein the separated vapors are dephlegmated before passing upwardly to the fractionating section 69.

Reflux condensate is withdrawn from tray 71 and conducted by a pump 74 through a line 75 to a heating coil 76 disposed in a furnace 77 adapted to heat the oil to a desired cracking temperature. The heated products are passed to the reaction chamber 63 wherein cracking conditions are maintained. Liquid is prevented from accumulating in the reaction chamber 63 by rapidly withdrawing all the vaporous and liquid products through line 62 to the chamber 61. Since it is generally preferable to carry on the thermal cracking at higher pressure than is best adapted for the catalytic cracking, the line 62 is conveniently equipped with a pressure reducing valve 78 so that the pressure may be stepped down in the chamber 61 which chamber also receives the products from the catalytic cracking operation. Cracking conditions may be maintained in the chamber 61, at least in the lower portion thereof, and in such case it is desirable to prevent the accumulation of liquid therein by rapidly withdrawing the liquid through line 72 and passing it to the dephlegmating section 70. In accordance with the invention a portion of the vapors may be included in the residue withdrawn through line 72 and the mixture of vapors and residue subjected to flashing or further vaporization in chamber 70, the resultant separated vapors dephlegmated and the dephlegmated vapors combined with the separated vapors from chamber 61 which enter the fractionator 69 through the line 66. Liquid residue is withdrawn from chamber 70 through a line 79. If desired, a portion of this residue may be circulated through the chamber 70 in a manner similar to the circulation of liquid carried on in chamber 23 of Fig. 1 and such cooling as may be necessary may be supplied by cooling a portion of the reflux condensate being withdrawn from tray 71. The fractionating section 69 is provided with suitable cooling or refluxing means for controlling the end point of the overhead vapors which may be condensed in a condenser coil 80 and collected as a distillate in a receiving drum or gas separator 81.

While the catalytic cracking of the raw charging stock or straight run condensate may be carried on in a once-through or single-pass manner it is sometimes advantageous to direct a portion of the cycle condensate to the catalytic cracking zone and for this purpose the cycle condensate line 75 may have a branch line 82 for directing a portion of the condensate to the charging line 56 or heating coil 57.

In practicing the invention with the apparatus illustrated in Fig. 1 a fraction of the crude oil such as a gas oil or kerosene stock is passed to the heating coil 17. The oil in transit through the coil 17 is vaporized and is heated sufficiently to maintain cracking temperatures of the order of 850° F.–1050° F. and preferably temperatures of 910° F.–1000° F. in the catalyst case 19. The products of the catalytic cracking are delivered to the fractionating zone 22. Topped or reduced crude from the crude stripping tower is introduced into the dephlegmating zone 22 to dephlegmate the vapors therein and effect partial vaporization of the topped or reduced crude. The vapors uncondensed in the dephlegmator 22 pass to the succeeding fractionator 28 wherein the gasoline or motor fuel distillate is separated from higher boiling reflux condensate which is directed to the heating coil 34. The oil is subjected to temperatures of the order of 950° F.–1050° F. under superatmospheric pressures such as 400–800 lbs. in the heating coil 34, the heated products are combined with the mixture of reflux condensate and unvaporized crude residuum withdrawn from the tray 24 and the combined constituents subjected to cracking in the reaction chambers 37 and 41 wherein cracking temperatures of the order of 900° F.–930° F. are maintained under superatmospheric pressures such as 200 to 600 lbs. Liquid is prevented from accumulating in the reaction chambers and in the last reaction chamber, wherein separation of vapors from liquid residue takes place, a portion of the vapors is withdrawn with the residue which is passed to the separating and dephlegmating section 23, while the vapors which are separately withdrawn through vapor line 42 are passed to the dephlegmating zone 22. In chamber 23 separation of vapors from residue takes place, the separated vapors are dephlegmated and the dephlegmated vapors passed to the fractionating zone 22. It is generally preferable to carry on the catalytic cracking operation at pressures lower than are used in the thermal cracking zone. Pressures such as 200 lbs. or 100 lbs. or even lower are quite satisfactory for the catalytic cracking operation, while ordinarily it is desirable to maintain superatmospheric pressure at least as high as about 200 lbs. in the thermal reaction chambers. The pressure in the fractionating tower 21 will normally be as high as possible and yet accommodate the receiving of products from the catalytic cracking zone.

In practicing the invention with the apparatus of Fig. 2 the conditions of temperature and pressure in the catalytic cracking zone and in the thermal cracking zone may be similar to those employed in the Fig. 1 operation. The pressure employed in the tower 61 should be as high as possible and yet accommodate the receiving of the cracked products from the catalytic cracking zone. Ordinarily in this operation it is desirable to carry superatmospheric pressures such as 100–200 lbs. in the tower 61 and reduce the pressure in the tower 68 so as to obtain an effective flashing of the residual products which are received from the tower 61. The stock charged to the tower 61 by the pump 65 may be drawn in a heated condition from a crude stripping still or may be suitably preheated by heat exchange with hot products of the system before introduction into the tower so as to facilitate the maintenance of cracking temperatures such as 850° F.–900° F. in the lower section of the tower.

While I have described a particular embodiment of my invention for purposes of illustration, it should be understood that various modifications and adaptations thereof which will be obvious to one skilled in the art, may be made within the spirit of the invention as set forth in the appended claims.

I claim:

1. In the conversion of hydrocarbon oils, the process that comprises subjecting raw charging stock to catalytic cracking, passing the resultant cracked products to a dephlegmating zone, introducing a heavier charging stock to said dephlegmating zone to dephlegmate the vapors therein, withdrawing from said dephlegmating zone a resultant mixture of reflux condensate and unvaporized constituents of said heavier charging stock and catalytically cracked products, subjecting uncondensed vapors from the dephlegmating zone to further fractionation to separate lighter products from higher boiling reflux condensate, directing said reflux condensate to a heating zone wherein it is subjected to cracking temperature, combining the resultant heated products with said mixture of reflux condensate and unvaporized constituents of said heavier charging stock and catalytically cracked products for thermal conversion in a reaction chamber, maintaining cracking temperatures of the order of 900° F. therein and preventing the accumulation of liquid therein and delivering evolved vapors from the thermal cracking operation to said dephlegmating zone.

2. In the conversion of hydrocarbon oils, the process that comprises subjecting raw charging stock to catalytic cracking, passing the resultant cracked products to a dephlegmating zone, introducing a heavier charging stock to said dephlegmating zone to dephlegmate the vapors therein, withdrawing from said dephlegmating zone a resultant mixture of reflux condensate and unvaporized constituents of said heavier charging stock and catalytically cracked products, subjecting uncondensed vapors from the dephlegmating zone to further fractionation to separate lighter products from higher boiling reflux condensate, directing said reflux condensate to a heating zone wherein it is subjected to cracking temperature, combining the resultant heated products with said mixture of reflux condensate and unvaporized constituents of said heavier charging stock and catalytically cracked products for thermal conversion in a reaction chamber, maintaining cracking temperatures of the order of 900° F. therein and preventing the accumulation of liquid therein, separating the resultant thermally cracked products into vapors and residue and directing resultant separated vapors to said dephlegmating zone.

3. In the conversion of hydrocarbon oils, the process that comprises separately distilling crude petroleum to form a distillate stock and a residual stock, passing said distillate stock once through a single pass catalytic cracking zone, passing the resultant cracked products to a dephlegmating zone, introducing said residual stock to said dephlegmating zone to dephlegmate the vapors therein, withdrawing from said dephlegmating zone a resultant mixture of reflux condensate and unvaporized constituents of said residual stock and catalytically cracked products, subjecting uncondensed vapors from the dephlegmating zone to further fractionation to separate lighter products from higher boiling reflux condensate, directing said reflux condensate to a heating zone wherein it is subjected to cracking temperature, combining the resultant heated products with said mixture of reflux condensate and unvaporized constituents of said residual stock and catalytically cracked products for thermal conversion in a reaction chamber, maintaining cracking temperatures of the order of 900° F. therein and preventing the accumulation of liquid therein, separating the resultant thermally cracked products into vapors and residue and directing resultant separated vapors to said dephlegmating zone.

4. In the conversion of hydrocarbon oils, the process that comprises subjecting raw charging stock to catalytic cracking, passing resultant cracked products to a dephlegmating zone, introducing a heavier charging stock to said dephlegmating zone to dephlegmate the vapors therein, withdrawing from said dephlegmating zone a resultant mixture of reflux condensate and unvaporized constituents of said heavier charging stock and catalytically cracked products and directing the mixture to a thermal cracking zone, subjecting uncondensed vapors from the dephlegmating zone to further fractionation to separate lighter products from higher boiling reflux condensate, directing said reflux condensate to a heating zone wherein it is subjected to cracking temperature and passing the resultant heated products to said thermal cracking zone for thermal conversion therein together with the aforesaid mixture, passing the resultant cracked products into a reaction chamber maintained under cracking conditions of temperature and pressure and wherein separation of vapors from residue takes place, preventing the accumulation of liquid residue therein by rapidly withdrawing the liquid together with a portion of the vapors, subjecting the withdrawn mixture of liquid and vapors to further vaporization, passing resultant evolved vapors to the aforesaid dephlegmating zone, and passing the separated vapors from said reaction chamber to said dephlegmating zone.

5. In the conversion of hydrocarbon oils, the process that comprises subjecting raw charging stock to catalytic cracking, passing resultant cracked products to a dephlegmating zone, introducing a heavier charging stock to said dephlegmating zone to dephlegmate the vapors therein, withdrawing from said dephlegmating zone a resultant mixture of reflux condensate and unvaporized constituents of said heavier charging stock and catalytically cracked products, subjecting uncondensed vapors from the dephlegmating zone to further fractionation to separate lighter products from higher boiling reflux condensate, directing said reflux condensate to a heating zone wherein it is subjected to cracking temperature, combining the resultant heated products with said mixture withdrawn from said dephlegmating zone and delivering the combined products to a reaction chamber maintained under cracking conditions of temperature and pressure and wherein separation of vapors from liquid residue takes place, preventing the accumulation of liquid residue therein by rapidly withdrawing the liquid together with a portion of the vapors, subjecting the withdrawn mixture of liquid and vapors to further vaporization, passing resultant evolved vapors to the aforesaid dephlegmating zone, and passing the separated vapors from said reaction chamber to said dephlegmating zone.

6. In the conversion of hydrocarbon oils, the process that comprises subjecting raw charging stock to catalytic cracking, passing resultant cracked products to a dephlegmating zone, introducing a heavier charging stock to said dephlegmating zone to dephlegmate the vapors therein, withdrawing from said dephlegmating zone a resultant mixture of reflux condensate and unvaporized constituents of said heavier charging stock and catalytically cracked products, subjecting uncondensed vapors from the dephlegmating zone to further fractionation to separate lighter products from higher boiling reflux condensate, directing said reflux condensate to a heating zone wherein it is subjected to cracking temperature, combining the resultant heated products with said mixture withdrawn from said dephlegmating zone and delivering the combined products to a reaction chamber maintained under cracking conditions of temperature and pressure and wherein separation of vapors from liquid residue takes place, preventing the accumulation of liquid residue therein by rapidly withdrawing the liquid together with a portion of the vapors, flash distilling the withdrawn mixture of liquid and vapors and dephlegmating the flashed vapors, passing the flashed and dephlegmated vapors to the aforesaid dephlegmating zone and passing the separated vapors from said reaction chamber to said dephlegmating zone.

7. In the conversion of hydrocarbon oils the process that comprises subjecting raw charging stock to catalytic cracking, passing the resultant cracked products of the catalytic cracking to a dephlegmating zone, introducing thermally cracked vapors to said dephlegmating zone, withdrawing from said dephlegmating zone a resultant mixture of reflux condensate and unvaporized constituents of the catalytically cracked products, subjecting uncondensed vapors from the dephlegmating zone to further fractionation to separate lighter products from higher boiling reflux condensate, directing said reflux condensate to a heating zone wherein it is subjected to cracking temperature, combining the resultant heated products with the aforesaid mixture withdrawn from the dephlegmating zone and subjecting the combined products to thermal conversion at temperatures of the order of 900° F. in a reaction zone wherein liquid is prevented from accumulating, separating resultant thermally cracked products into vapors and residue and utilizing resultant separated vapors as the thermally cracked vapors introduced to said dephlegmating zone.

JOSEPH MASON BARRON.